(No Model.) 2 Sheets—Sheet 2.
T. T. RODES.
HAND CULTIVATOR.
No. 526,818. Patented Oct. 2, 1894.
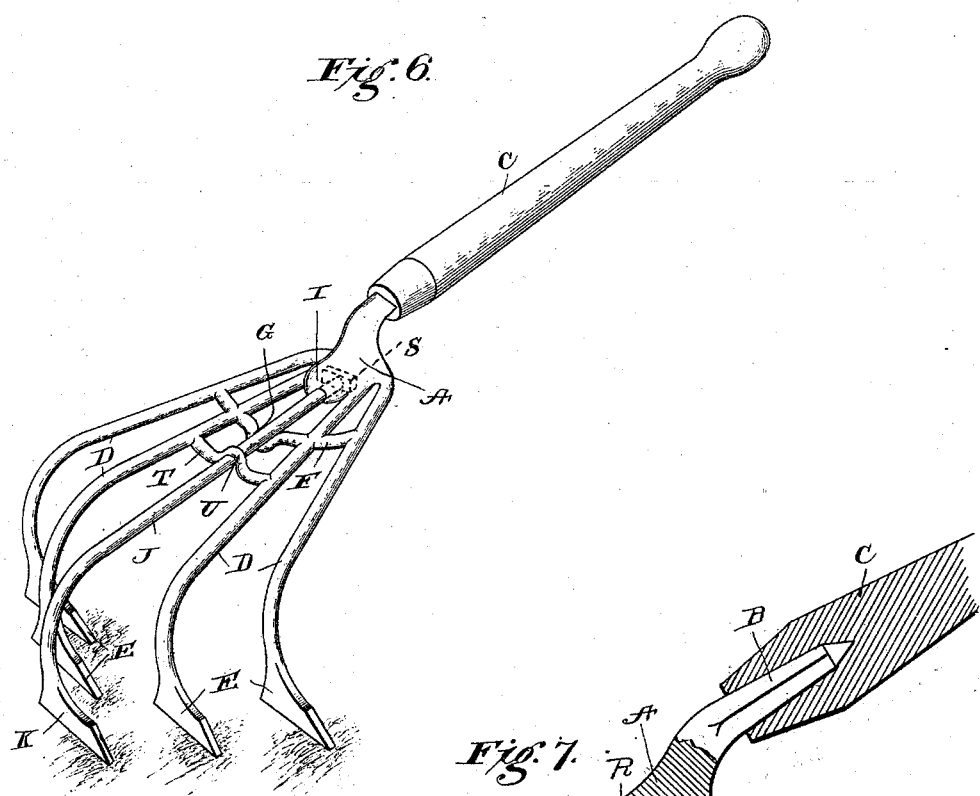
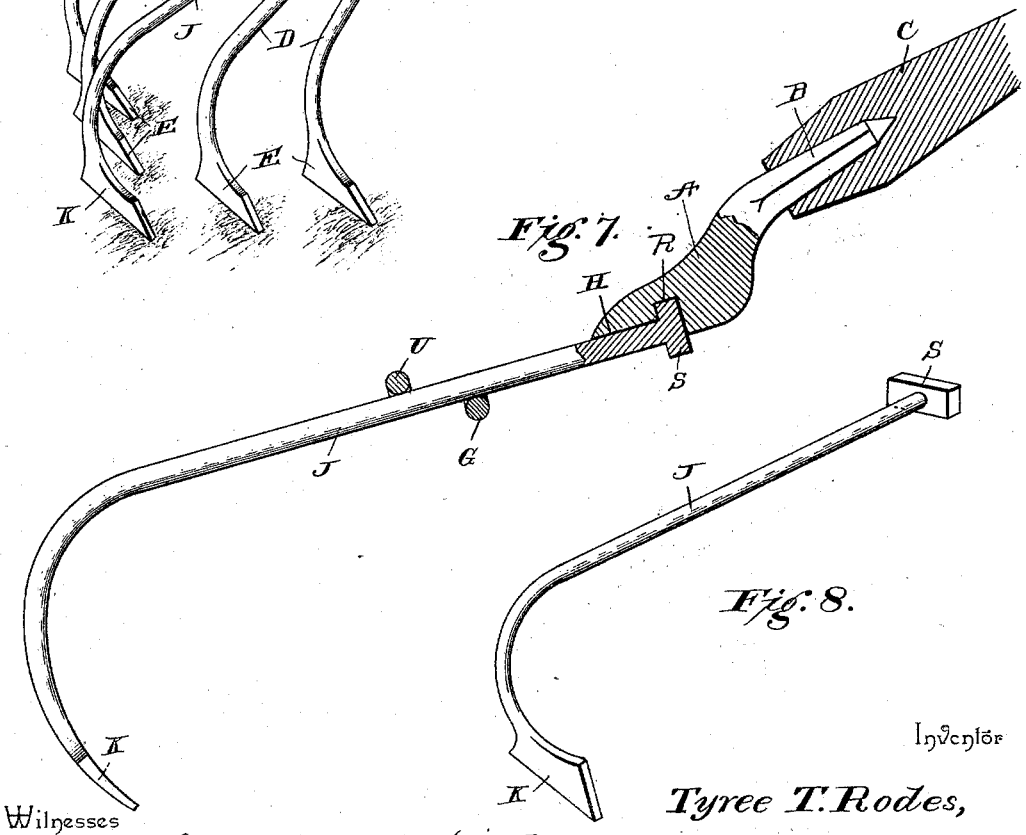
Witnesses
Inventor
Tyree T. Rodes,
By his Attorneys.

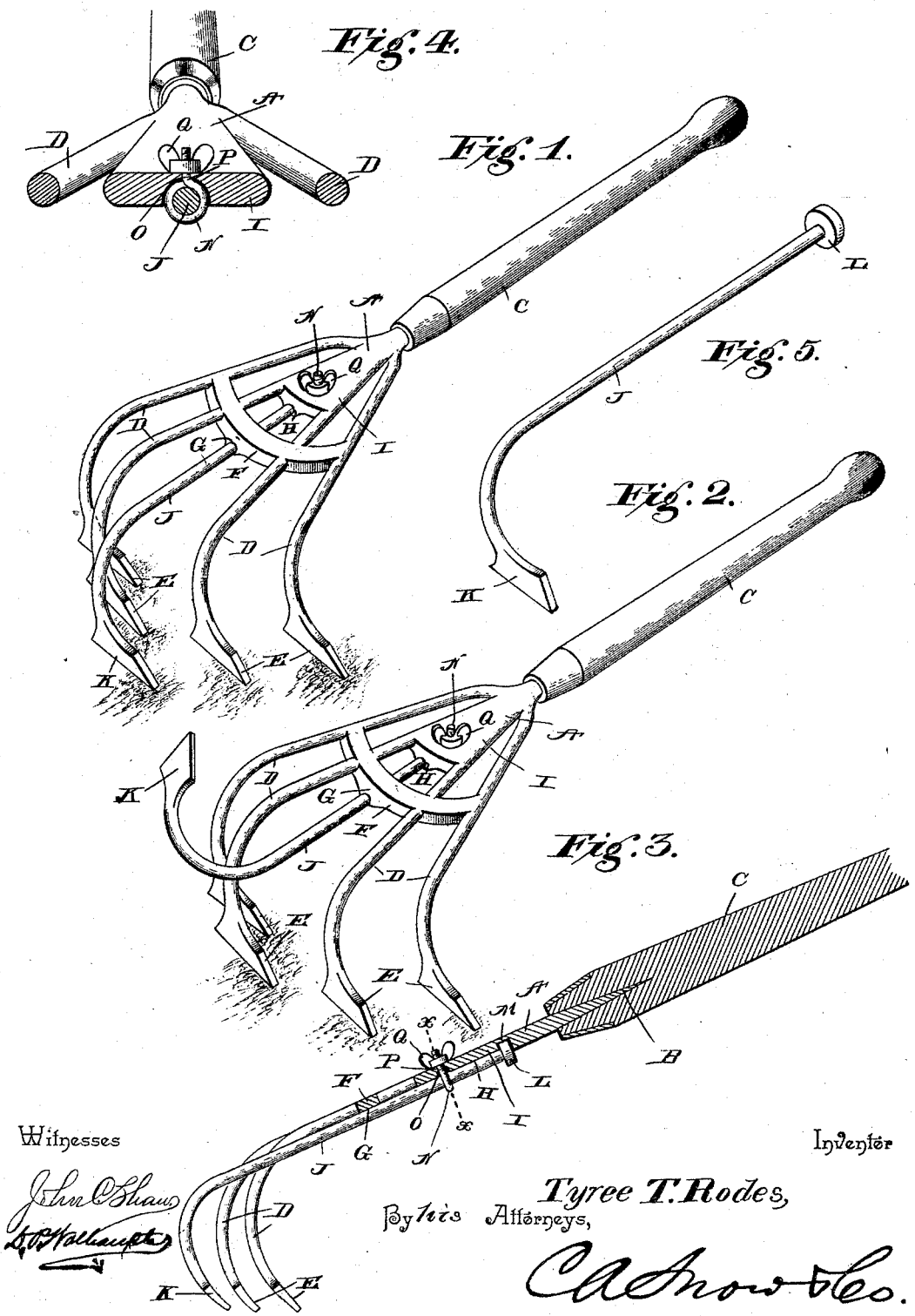

UNITED STATES PATENT OFFICE.

TYREE T. RODES, OF PARIS, MISSOURI.

HAND-CULTIVATOR.

SPECIFICATION forming part of Letters Patent No. 526,818, dated October 2, 1894.

Application filed February 21, 1894. Serial No. 501,017. (No model.)

*To all whom it may concern:*

Be it known that I, TYREE T. RODES, a citizen of the United States, residing at Paris, in the county of Monroe and State of Missouri, have invented a new and useful Hand-Cultivator, of which the following is a specification.

This invention relates to hand cultivators; and it has for its object to effect certain improvements in that class of cultivators particularly designated for garden cultivation. To this end the main and primary object is to provide a simple and inexpensive garden cultivator or hoe which shall provide means for cultivating the vegetation in any desired manner, and particularly to provide means whereby a person can cultivate on both sides of small vegetation at one and the same time while at the same time being able to easily and quickly remove any foreign growth that may be growing between the rows or hills of the particular vegetation being cultivated, and also to stir up and loosen the ground deeply near the growing vegetation where the entire tool could not be conveniently used.

With these and other objects in view which will readily appear as the nature of the invention is better understood, the same consists in the novel construction, combination and arrangement of parts hereinafter more fully described, illustrated and claimed.

In the accompanying drawings:—Figure 1 is a perspective view of a hand cultivator constructed in accordance with this invention. Fig. 2 is a similar view with the central tooth turned to a position from between and above the other teeth to permit the tool to straddle the vegetation. Fig. 3 is a central vertical longitudinal sectional view of the cultivator head including the teeth thereof. Fig. 4 is a transverse sectional view on the line *x—x* of Fig. 3. Fig. 5 is a detail in perspective of the central revoluble tooth. Fig. 6 is a perspective view of a modification. Fig. 7 is a central longitudinal sectional view of the modification. Fig. 8 is a detail in perspective of the revoluble center tooth with a T-flange or head.

Referring to the accompanying drawings, A represents the cultivator head consisting of a suitable size of casting provided with a single pointed attaching shank B, extended from one side thereof and adapted to be fitted in the inner end of the handle C, in any suitable manner, and said handle is of a convenient length to permit of the easy manipulation of the cultivator or hoe.

The cultivator head A, is preferably cast with a series of diverging cultivating teeth D. The cultivating teeth D, diverge from a common center at the base of the shank B, of the head, and are of the usual bowed shape and terminate at their lower ends in the diamond shaped points E, which are best suited for breaking up the earth around the vegetation being cultivated, and it will of course be understood that there may be any desired number of the teeth D, so long as there are the same number at each side of the central longitudinal line of the head, and together provide an even number of teeth.

The oppositely disposed series of the teeth D, which are preferably cast integral with the head of the cultivator, are additionally braced together by the outer curved casting rim F, joining the several teeth together and cast integrally therewith, and said outer casting rim is provided at its center with the under bearing groove G, which aligns with the central under bearing groove H, of the intermediate solid portion I, of the casting, which is cast at an intermediate point to connect the two central ones of the stationary teeth D, thereby substantially completing the cast head provided with the stationary teeth referred to, and it is to be observed at this point that while I have particularly described the teeth as being cast integral with and forming a part of the cultivator head, it is simply necessary, for the purposes of this invention, to have the teeth D, stationary, and in a fixed position arranged in opposite sets or series to admit of straddling the cultivation, which is spanned by the two intermediate teeth D, and these teeth may be fastened stationary in or on the head by any other suitable or approved means for securing the desired result.

The central under bearing groove G—H, of the casting, is designed to loosely accommodate the inner shank end of the central revoluble cultivator tooth J. The central tooth J, is of the same bowed shape as the other teeth which are stationary, and terminates at its outer lower end in the diamond shaped cultivating point K, while the inner fastened end of the said tooth terminates in or is provided with a circular bearing flange or knob L, which freely turns in a similarly shaped groove M, located at the inner end of the groove H. The central revoluble tooth J, is held in its adjusted position by means of a hooked or looped securing bolt N, the eye of which is adapted to fit in the bolt recess or socket O, formed in the under side of the solid portion H, and communicating with the bolt opening P, through which projects the threaded shank of the bolt, and which is engaged by the winged thumb nut Q, for tightening the bolt onto the shank of the central tooth J, and firmly holding the same in position, but in lieu of the fastening means described, any suitable fastening devices may be employed for properly securing the central tooth in position.

Ordinarily, in using the tool, the point end of the central tooth is disposed downward in proper alignment with the other stationary teeth so that the tool may be used for cultivating with all of the teeth, but, when it is desired to straddle the vegetation and simply cultivate at the sides of the row or hill with the opposite sets of stationary teeth, the fastening devices of the central tooth are loosened and such tooth is rotated or revolved in its bearing to dispose the bowed point end of the same upwardly, and thereby leave a space between the central ones of the teeth D. In this position the central tooth is not without use, for it will be obvious that the point K, of such tooth, is in a position convenient for use, by simply reversing the tool, and this function of the central tooth is very useful in adapting such tooth for removing any foreign growth that may be growing between the rows or hills of the vegetation being cultivated, and for deeply stirring up and loosening the ground near the growing vegetation where all of the teeth of the tool could not be used.

Changes in the form, proportion and the minor details of construction may be resorted to without departing from the principle or sacrificing any of the advantages of this invention, for it will be obvious that such changes and modifications may be resorted to as illustrated in Figs. 6, 7 and 8 of the drawings.

While I have already described the preferred form of my improved cultivator and the means for fastening the central revoluble tooth in position, by reference to the figures referred to it will be seen that the solid portion I, of the head A, is somewhat shortened, and at the inner end of the groove H, is located a squared socket R, into which is adapted to be sprung the T-flange or head S, formed at the inner end of the central revoluble tooth J. In this modification the shank of the tooth J, is also adapted to rest and turn in the central under bearing groove G, formed at the center of the curved casting rim F, and beyond the said curved casting rim is located a short bearing brace T, provided with a centrally depressed bearing U, in which rests the shank of the tooth J. Now it is to be understood that the teeth of the cultivator are preferably made of spring metal, and by reason of the shank of the center tooth J, passing over the short bearing brace and under the casting rim F, the T-flange or head S, will be firmly held in the socket R, to securely fasten the said center tooth in either of its adjusted positions, and to prevent the same from turning. To remove the center tooth from its connection with the socket R, so as to adjust the same up or down, it is simply necessary to press downward on the inner fastened end of the tooth to disengage the flange or head S, from the socket R, and then the tooth is pulled forward, turned up or down and pushed back again to allow the flange or head S, to spring into the socket R to effect either the up or down adjustment, as will be easily understood, and by reason of the said center tooth binding at the three points noted in the modification, the same will remain firmly in its place, yet can be readily and easily removed or adjusted. The said T-flange or head S, may be substituted for the circular flange or knob L, shown in the preferred construction of cultivator, and this may be found desirable at times in order to prevent any rocking motion, and may be used in connection with the bolt N, which may be loosened to disengage the flange or head of the tooth from the sockets so that the same may be turned in substantially the same manner just described and then re-tightened, and it is of course to be understood in connection with the several modifications noted that all the teeth may be of spring steel as well as the center tooth, and otherwise attached to the cast head than by being integral parts thereof.

Having thus described the invention, what is claimed, and desired to be secured by Letters Patent, is—

1. In a hand light skeleton cultivator, the cultivator head provided with opposite sets of diverging cultivating teeth integrally cast therewith, a central adjustable tooth revolubly mounted on the skeleton head between the central cast teeth, and adapted to be fastened to the solid portion of the head in either an upturned or downturned position, substantially as set forth.

2. In a hand cultivator, the combination with the handle; of a cast skeleton head having opposite sets of integral stationary cultivating teeth and a rim connecting the teeth and having a central bearing groove between the central ones of such teeth, an adjustable center tooth revolubly mounted in said bearing groove, and a fastening device for the inner end of said center tooth, substantially as set forth.

3. In a hand cultivator, the cast head having opposite sets of stationary diverging cultivating teeth, an outer curved casting rim connecting the several teeth and having a central bearing groove, and an intermediate solid portion having a similar groove aligned with that of the rim, an adjustable center tooth mounted to turn in said aligned grooves, and a fastening bolt for holding the center tooth stationary in its adjusted position, substantially as set forth.

4. In a hand cultivator, the cast head having opposite sets of stationary cultivating teeth, and an intermediate solid portion provided with a central bearing groove, a circular groove at the inner terminal of the central bearing groove, and a bolt recess or socket, a revoluble center tooth mounted to turn in said bearing groove and having a circular bearing flange or knob at one end turning in said circular groove, and a hooked or looped bolt engaging said center tooth and fitting in said bolt recess or socket, substantially as set forth.

5. In a hand cultivator, a light skeleton body having opposite sets of stationary cultivating teeth, a bearing groove, and a bolt recess or socket in the line of said groove, a center revoluble tooth mounted to turn in said groove, and a looped bolt embracing said center tooth and fitted in said recess or socket, substantially as set forth.

In testimony that I claim the foregoing as my own I have hereto affixed my signature in the presence of two witnesses.

TYREE T. RODES.

Witnesses:
F. V. RAGSDALE,
DAVID HELM.